Figure 4:
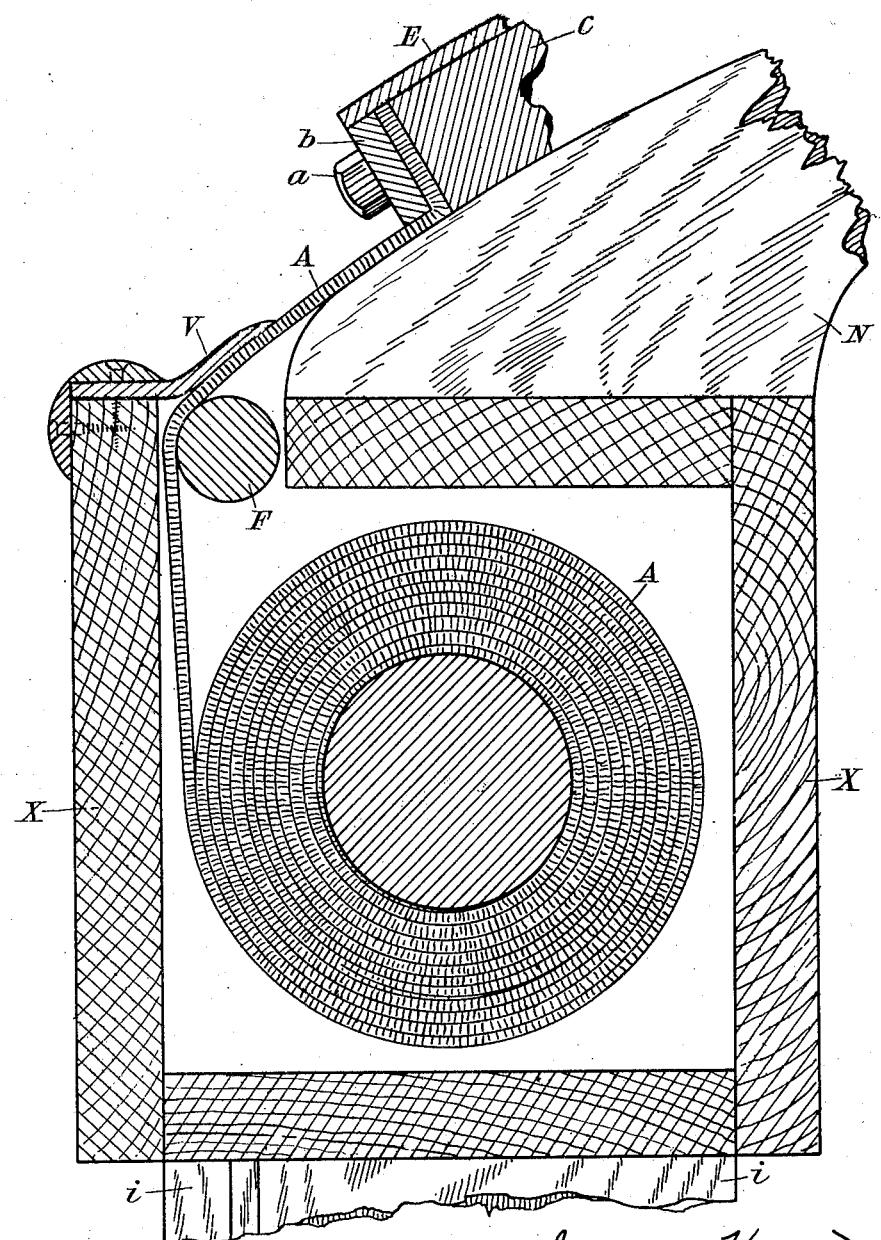

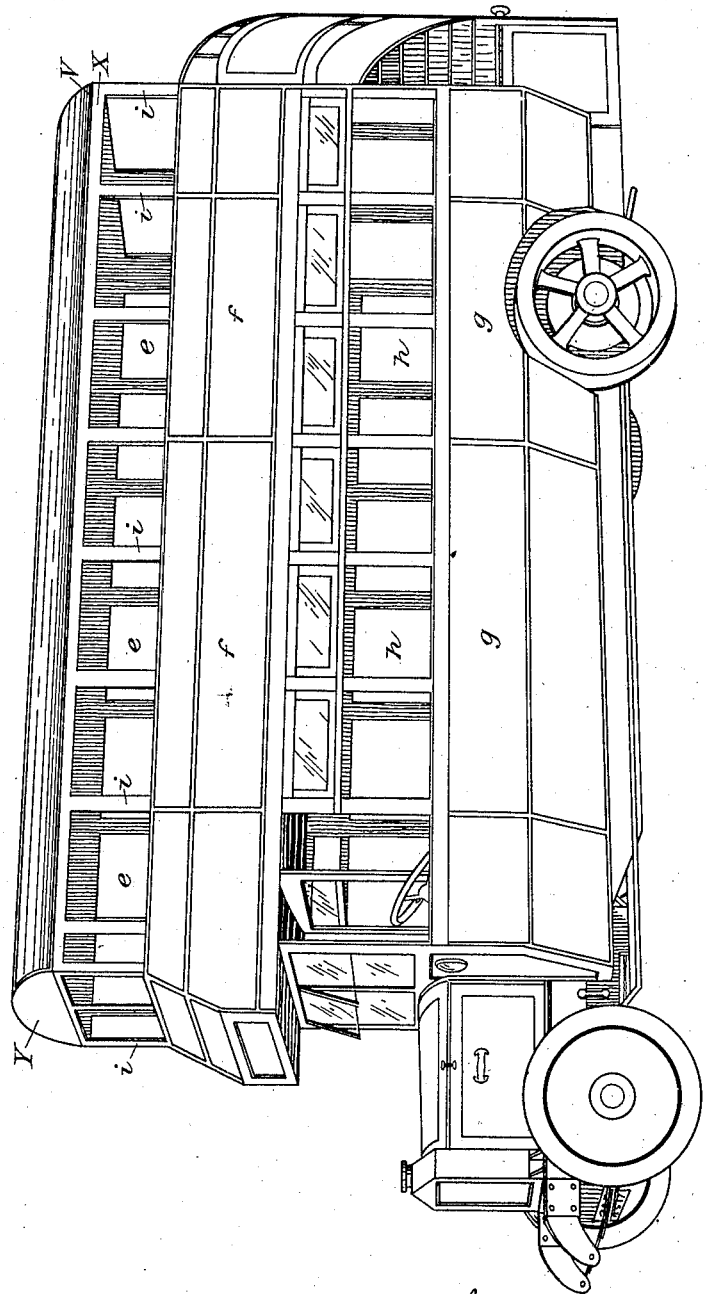

Jan. 25, 1927. 1,615,513
J. HEYWOOD
VEHICLE COVER
Filed Jan. 12, 1926   3 Sheets-Sheet 2
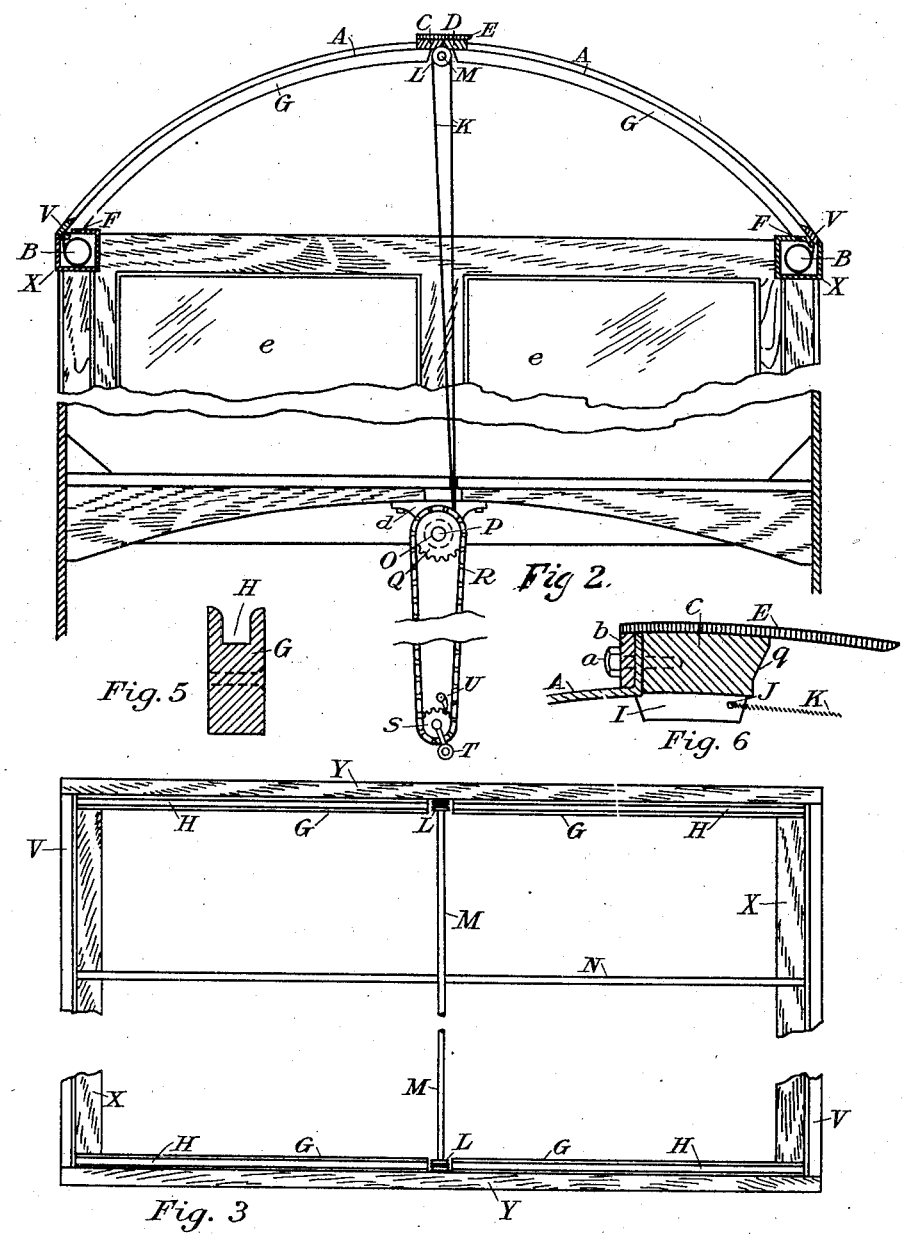
Jeannette Heywood
INVENTOR.
BY
ATTORNEY.

Patented Jan. 25, 1927.

1,615,513

UNITED STATES PATENT OFFICE.

JEANNETTE HEYWOOD, OF DENVER, COLORADO.

VEHICLE COVER.

Application filed January 12, 1926. Serial No. 80,772.

The present invention relates to covers for vehicles, and particularly for the upper decks of motor omnibuses or the like. It is usually desirable to have these upper decks open, but in case of sudden storm or inclement weather it is desirable to have means quickly available to protect the passengers. It is the object of the present invention to provide a novel and practical structure of this character that can be stored where it is entirely out of the way and yet can be quickly extended by the operator of the omnibus, so that complete protection is afforded to the occupants of the upper deck, thus making said deck available for use irrespective of weather conditions.

In the accompanying drawings:

Figure 1 is a perspective view of an omnibus equipped with the preferred embodiment of the invention, and showing it in its operative position, Figure 2 is a fragmentary vertical sectional view therethrough, Figure 3 is a top plan view of the frame, with intermediate portions broken away, Figure 4 is a detail vertical sectional view on an enlarged scale through one of the boxes that houses a spring roller and a cover section, Figure 5 is a detail sectional view through one of the end guides, Figure 6 is a detail sectional view illustrating more particularly the connecting means between one of the meeting bars and cover sheet.

In the embodiment disclosed, the bus may be of any well-known character, and includes a body $g$ having the usual windows $h$ supporting an upper deck or section $f$. This upper section includes vertical frame bars $i$, defining window openings $e$, which may be closed in any desired manner, as for instance, by windows which let down into the side walls of the deck structure $f$. The ends include upper closed walls Y, which may have curved upper edges or provided with any desired configuration.

The side posts $i$ support on their upper ends boxes X that thus extend longitudinally along the sides of the upper deck and contain spring rollers B that also extend the length of the deck. On the inner sides of the end walls Y are located supporting and guide bows G that extend from one box to the other, and preferably have longitudinal channels H in their upper sides, as illustrated in Figures 3 and 5. Other supporting bows N, one of which is shown in Figure 3, also extend across the space between the boxes and may be located above each set of posts $i$. Wrapping upon the spring rollers B are sheets A, preferably of rubberized or other water-proof fabric. These sheets pass out through slots F formed in the upper outer corners of the boxes X and have their free edges secured to meeting bars C—D. Preferably this is accomplished, as shown in Figure 6, by clamping the free margins of the sheets A between the rear edges of the meeting bars C—D and clamping strips $b$ that are secured in place by suitable bolts or screws $a$. The meeting bars C—D also have at their ends depending guides I that slide in the guideways H. The meeting bars C—D slide upon the bows G and N and are adapted to be brought together centrally over the deck, as shown in Figure 2, in which case obviously the sheets A are drawn from the rollers B against the resistance of the springs of said rollers, and are extended as a cover over the deck. One of the meeting bars C—D, is preferably provided with a suitable flap E, which overlies the other bar when the bars are together, thus covering the joint between the bars, and flaps V, secured to the outer corners of the boxes X, also lie upon the said sheets and serve to deflect moisture running down the sheets outwardly to the outer sides of the side walls of the deck.

For the purpose of extending the sheets, the following mechanism is preferably employed: Secured to the ends of the meeting bars C—D, preferably by being engaged in openings J in the guides I, are cables K. These cables pass over rollers L mounted on a shaft M that exends centrally and longitudinally above the deck and is covered by the meeting bars C—D. These cables K pass downwardly and wrap upon winding drums O secured to a shaft P that is preferably located longitudinally beneath the deck or floor, and is journaled in brackets $d$. Also secured to the shaft P is a sprocket wheel Q, around which operates a sprocket chain R that passes around a lower sprocket wheel S. This lower wheel S has fixed to it a handle crank T, preferably located in convenient relation to the operator of the omnibus. A pawl U engages the teeth of this lower sprocket wheel S so as to hold it against retrograde movement under the action of the rollers B.

With this construction, it will be evident that when the weather is pleasant the cover sections may be housed within the boxes X, leaving the top over the deck freely open and correspondingly the closures for the window openings e may be stored, thus giving the full effect of an open upper deck. In inclement weather, and in case of sudden storm the operator has only to turn the crank T, whereupon the two sections of the cover will be drawn together, forming a weather-proof roof, and in turn the windows may be raised to close the sides. The result is that passengers who may be upon the upper deck will be protected and in ordinary inclement weather this deck is available as a closed in-passenger carrying space.

From the foregoing, it is thought that the construction, operation and many advantages of the herein described invention will be apparent to those skilled in the art, without further description, and it will be understood that various changes in the size, shape, proportion and minor details of construction, may be resorted to without departing from the spirit or sacrificing any of the advantages of the invention.

What I claim, is:

1. In a vehicle, the combination with a deck and upstanding supports along the sides thereof, boxes mounted on the supports and having outlet openings in their upper and outer portions, rollers within the boxes, supporting bows having their ends mounted on the boxes on the inner sides of the outlet openings and extending across the space between the boxes and over the deck, cover sheets that wrap upon and unwrap from the rollers, and means for drawing the sheets together from the rollers and upon the bows over the deck.

2. In a vehicle, the combination with a deck, of upstanding side frames along opposite edges thereof, boxes supported on the side frames, rollers journaled in the boxes, bows extending over the deck between the boxes, sheets that wrap upon the rollers and are adapted to be drawn together upon the bows, meeting bars that slide upon the bows to which the free ends of the sheets are attached, means connected to the bars for drawing the bars together, a joint covering flap carried by one bar and adapted to overlie the other bar when the bars are together, and deflecting flaps attached to the boxes and overlying the portions of the curtains adjacent the boxes.

In testimony whereof, she affixes her signature.

JEANNETTE HEYWOOD.